United States Patent [19]

Spring

[11] Patent Number: 5,536,374
[45] Date of Patent: Jul. 16, 1996

[54] EVAPORATOR FLASK FOR A ROTARY EVAPORATOR

[75] Inventor: Arthur Spring, Flawil, Switzerland

[73] Assignee: Buchi Labortechnik AG, Flawil, Switzerland

[21] Appl. No.: 183,319

[22] Filed: Jan. 19, 1994

[30] Foreign Application Priority Data

Oct. 14, 1993 [DE] Germany .......................... 9315698 U

[51] Int. Cl.$^6$ ...................................... B01D 3/10
[52] U.S. Cl. .................. 202/175; 159/6.1; 159/25.1; 159/DIG. 16; 159/DIG. 42; 202/205; 202/238; 202/265; 203/DIG. 2
[58] Field of Search .................................. 202/205, 238, 202/175, 265, 269; 159/DIG. 16, 6.1, DIG. 42, 25.1, 25.2; 203/DIG. 2, 91

[56] References Cited

U.S. PATENT DOCUMENTS

| | | | |
|---|---|---|---|
| 2,539,699 | 1/1951 | Perry et al. ............................. | 202/175 |
| 3,054,444 | 9/1962 | Robbins ................................. | 202/238 |
| 3,138,370 | 6/1964 | Anderson et al. ..................... | 202/175 |
| 3,837,491 | 9/1974 | Humiston et al. ..................... | 202/238 |
| 4,780,178 | 10/1988 | Yoshida et al. ........................ | 202/205 |
| 4,790,911 | 12/1988 | Parkinson .............................. | 202/205 |
| 4,913,777 | 4/1990 | Parkinson .............................. | 202/238 |
| 5,419,814 | 5/1995 | Kunihiro et al. ....................... | 202/236 |

FOREIGN PATENT DOCUMENTS

| | | | |
|---|---|---|---|
| 1504099 | 2/1992 | European Pat. Off. . | |
| 1583466 | 10/1969 | France .................................... | 202/238 |
| 0356998 | 11/1972 | U.S.S.R. ................................. | 202/238 |
| 0869990 | 6/1961 | United Kingdom .................. | 202/238 |

*Primary Examiner*—Virginia Manoharan
*Attorney, Agent, or Firm*—Shoemaker and Mattare, Ltd.

[57] ABSTRACT

An evaporator flask for a rotary evaporator is formed in two portions: a bowl and a lid secured to the bowl by a connecting ring. The lid is connected to a rotary drive means, and a conduit passes through the lid to provide fluid communication between the interior of the flask and a condenser. A mechanical scraper or stirrer is affixed to the end of the conduit within the bowl portion of the flask.

5 Claims, 2 Drawing Sheets

5,536,374

EVAPORATOR FLASK FOR A ROTARY EVAPORATOR

BACKGROUND OF THE INVENTION

The invention concerns an evaporator flask for a rotary evaporator. These types various rotary evaporators are commonly known and in use. DE-A-25 34 446, for example, shows such a rotary evaporator with a vapor duct pipe for transfer of the vapor through a holding and drive device. The holding and drive device supports the flask and transmits the rotational motion. Since the cooler or condenser are arranged to be stationary, and the flask, on the other hand, rotates, a shaft seal with a sealing lip is anticipated, which engages in the vapour duct pipe.

EP-A1-504 099 shows a comparable arrangement with a two part duct pipe.

With rotary evaporators, in practice round flasks or pear-shaped flasks are almost exclusively used. Regarding the partial vacuum prevailing in the flask, the mechanical loading from the freely projecting, inclined flange attachment, and regarding adequate formation of a thin film, these types of round or pear-shaped flasks are considered by the expert as being the only alternative for use in connection with rotary evaporators. The disadvantages dictated by the geometry of round or pear-shaped flasks, such as, for example, difficult cleaning and the risk of foaming over, have for decades been accepted as unavoidable.

SUMMARY OF THE INVENTION

The invention serves the purpose of improving evaporator flasks of this type, and in particular to optimize their deployment and properties during use.

According to the invention, in an optimally simple way, by means of the two part formation of the flask, free access to the bowl portion of the flask is achieved after removal of the lid portion. In this way, paste or powder products can also be filled or removed in a simple way. This applies also for adhered or encrusted residue. Here, for example, also the lid portion can remain attached to the drive device, with only the bowl portion being detached for removal or filling of material. Thus, operating is not only facilitated, but also accelerated.

Through the approximately cylindrical formation of the bowl portion, both good access through the opening, and a desirable enlargement of the surface and a reduction in the tendency to foam over are achieved in the simplest way.

In this case, included in the term "approximately cylindrical" are cross sectional shapes with which the container wall runs tube-shaped and cylindrical, or also inclined slightly conically inwards or outwards, without at the same time departing from the bowl character of the flask.

Evidently, the cylindrical shape of the bowl portion also permits introduction of sensors or mechanical manipulators for the filled material. For example, scrapers for continuous scraping of the filled material or spreading of the filled material can be employed. Stirring apparatus or mixing arrangements can be anticipated. Also combinations of these types of manipulators, such as, for example, a scraper and agitator as a unit, can be employed. In order to remove the filled material, here merely the bowl portion must be released from the lid portion, and the manipulator can be removed through the bowl opening.

The lid portion itself can be constructed in such a way that it possesses a first flange for attachment to the holding and drive device, as well as a second flange for connection to the bowl portion.

In order to cope with tolerances of fit and to ensure sealing properties, also at low pressure, it is practical if a seal element is arranged between the lid portion and the bowl portion. The lid portion can be connected under tension to the bowl portion by means of a connecting element, for example a threaded ring or tension element, so that reliable sealing is ensured. It is also conceivable to form the lid portion with a cylindrical flange which engages, with a sealing fit, in the opening of the bowl portion, and which "sucks" on the bowl portion when a vacuum is applied, without the necessity for a separate connecting element. If an arrangement for the mechanical influence of the filled material is anticipated in the bowl portion, this can be suitably attached to a holder which is attached to the stationary portion of the vapour duct pipe. In addition, it is practical if the holder is surrounded by the vapour duct pipe.

BRIEF DESCRIPTION OF THE DRAWINGS

In the following, embodiments of the invention are more closely described on the basis of the drawings. Namely.

DESCRIPTION OF THE PREFERRED EMBODIMENT

Figure 1:
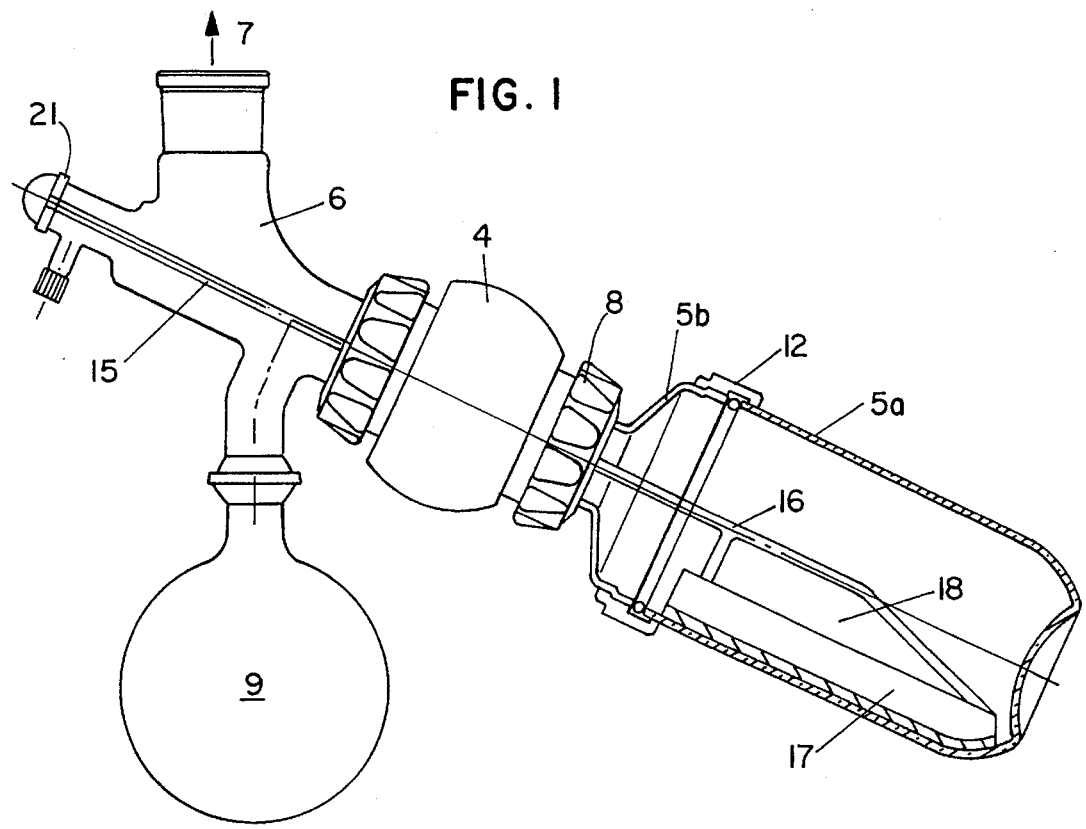
FIG. 1 schematic representation of a rotary evaporator with the features of the invention, FIG. 2 conventional construction of a rotary evaporator with a round flask, FIG. 3 the evaporator flask according to FIG. 1 in enlarged scale, and FIG. 4 a modified embodiment of an evaporator flask.

FIG. 1 shows an evaporator flask 5 which is connected to a vapour duct pipe 6 by means of a threaded connection 8, said pipe on the one hand being connected to a collector vessel 9 and on the other hand to a cooler 7.

Figure 2:
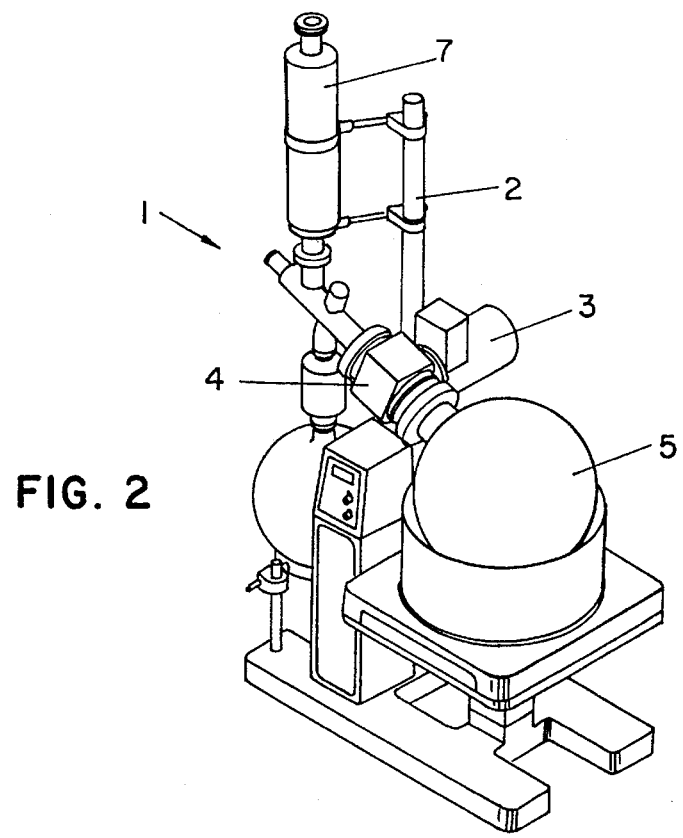

FIG. 2 shows the general construction of a rotary evaporator 1, a conventional round flask 5 being represented in this case. With an arrangement according to FIG. 2, the evaporator flask according to the invention and according to FIG. 1 can be directly used instead of a conventional evaporator flask. With such an arrangement, a stand portion 2 is provided on which a motor 3 is attached, said motor driving the evaporator flask 5 via a holding and drive device 4. The vapor duct pipe 6, through which the vapor rising up from the flask 5 is guided to the cooler, runs through the drive portion 4 (FIG. 1). The cooler 7 is, in a known way, fixed on the stand 2 to be stationary.

Figure 3:
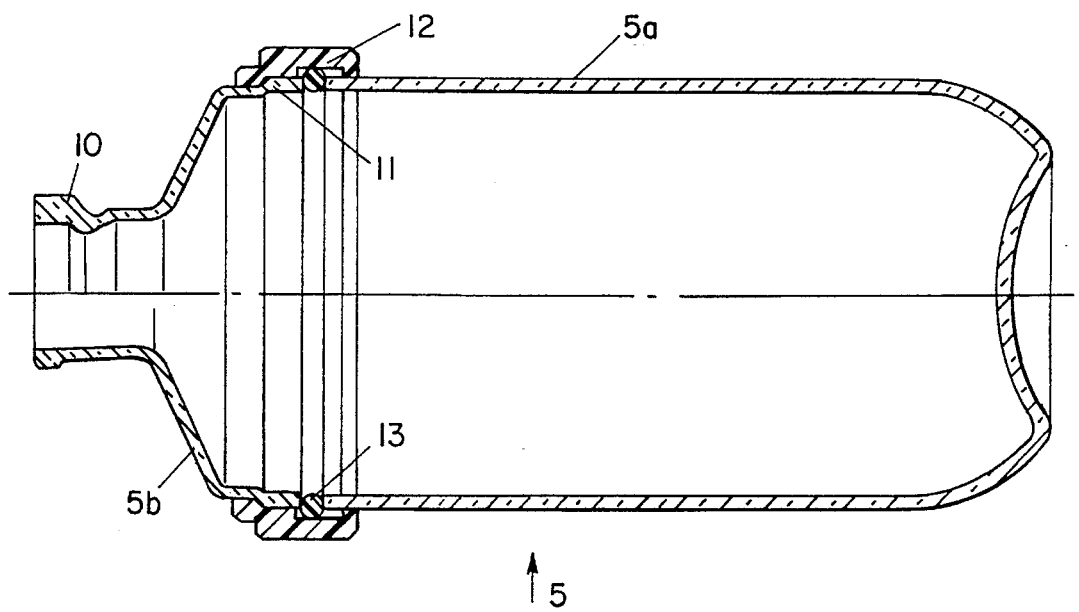

As can be seen from FIGS. 1 and 3, the evaporator flask 5 comprises a cylindrical bowl portion 5a and a lid portion 5b. The lid portion 5b is on the one hand provided with a flange 10 through which it is able to be fixed by means of a threaded connection 8 to the drive device 4. On the other hand, the lid portion 5b possesses a second flange 11, on which the connecting element in the form of a threaded ring 12 is provided. The threaded ring 12 engages in a corresponding thread (not shown) on the outer edge of the bowl portion 5a, so that the lid portion 5b and the bowl portion 5a can be screwed firmly together. An elastic sealing ring 13 is arranged in the threaded ring 12 for sealing purposes, said sealing ring being pressed into a sealing position between the lid portion 5b and the upper edge of the bowl portion 5a during screwing on of the threaded ring 12. The threaded portion 12 can, in a known way, either be provided with a continuous thread or a bayonette type thread, or another type of an arrangement for positive, interlocking connection of the bowl portion 5a and the lid portion 5b.

As can be seen from FIG. 1, a holder 15 is affixed in the stationary vapor duct pipe 6 by means of a fixing device 21, said fixing device being surrounded by the vapor duct pipe 6 and protruding into the flask 5. An arrangement 16 is provided on the a holder 15 with which the filled material located in the flask 5 can be mechanically influenced. Obviously, the holder 15 and, with it, the arrangement 16, remain stationary since they are attached to the stationary vapour duct pipe 6. If, then, the flask 5 rotates during operation, a relative motion between the material in the flask 5 and the arrangement 16 will ensue, so that the material is able to be influence mechanically (e.g., stirred or scaped). The arrangement 16 carries a scraper which in operation constantly sweeps over the inner wall of the flask and, with that, wipes the material located in the flask and spreads it on the flask wall. In the upper area of the arrangement 16 an opening 18 is provided, so that the arrangement 16 can at the same time act as a stirring apparatus for the material located in the flask 5.

Figure 4:
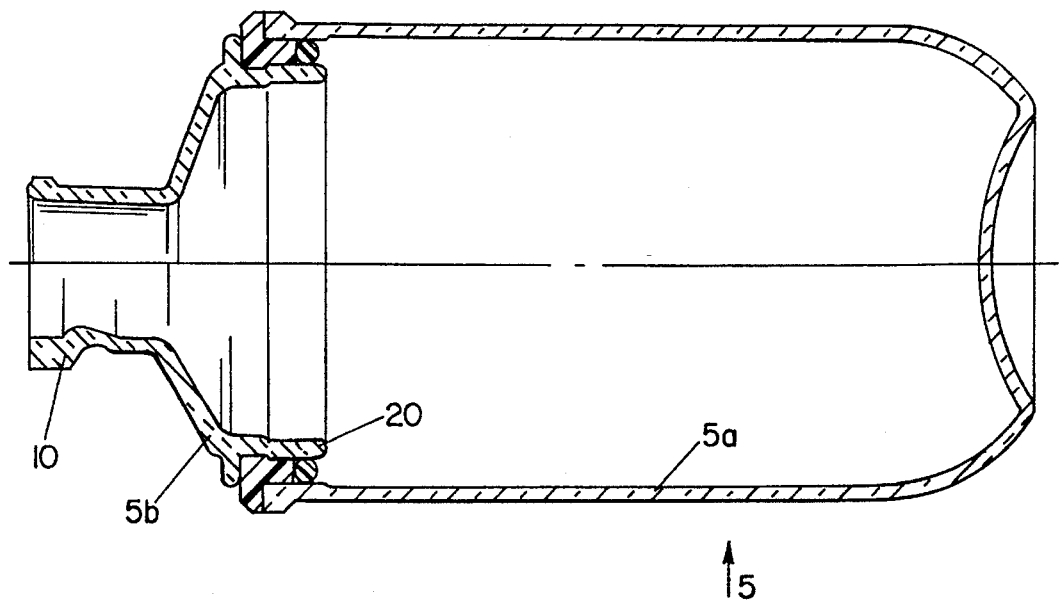

FIG. 4 shows a modified embodiment of a flask 5 with a lid portion 5b and a bowl portion 5a. Here, the lid portion 5b is provided with a cylindrical extension 20 which engages in the bowl portion 5a, and supports said bowl portion's wall in the area of the opening from the inside. Evidently, this type of arrangement, in respect of the high partial vacuum, is particularly resistant to loading.

Inasmuch as the invention is subject to modifications and variations, the foregoing description and accompanying drawings should not be regarded as limiting the invention, which is defined by the following claims and various combinations thereof:

What is claimed is:

1. An evaporator flask for an evacuated vacuum rotary evaporator comprising a vapor duct pipe for connecting the evaporator flask's interior with a condenser and for evacuating the evaporator flask, a drive device for holding and rotating the evaporator flask, said evaporator flask being formed as a closed two part vessel consisting essentially of a cylindrical bowl portion, and a lid portion having means for connection to said drive device, and means for joining said lid portion to said bowl portion, said rotary evaporator further comprising means extending into the bowl portion for mechanically influencing a material in the evaporator flask.

2. An evaporator flask according to claim 1, wherein said connection means includes a first flange on said lid portion, and said lid portion has a second flange attachable to the bowl portion.

3. An evaporator flask according to claim 1, wherein said evaporator flask has a sealing element arranged between the lid portion and the bowl portion.

4. An evaporator flask according to claim 1, wherein said influencing means is a scraper for spreading or wiping residue on the bowl wall.

5. A evaporator flask according the claim 1, wherein said influencing means is a stirrer.

* * * * *